(12) United States Patent
McDaniel et al.

(10) Patent No.: US 8,831,916 B2
(45) Date of Patent: Sep. 9, 2014

(54) SIMPLIFIED SMOOTHED PARTICLE HYDRODYNAMICS

(75) Inventors: Richard Gary McDaniel, Hightstown, NJ (US); Zakiya Tamimi, Kent, OH (US)

(73) Assignee: Siemens Aktiengesellschaft, Munich (DE)

( * ) Notice: Subject to any disclaimer, the term of this patent is extended or adjusted under 35 U.S.C. 154(b) by 329 days.

(21) Appl. No.: 13/354,797

(22) Filed: Jan. 20, 2012

(65) Prior Publication Data

US 2012/0284002 A1 Nov. 8, 2012

Related U.S. Application Data

(60) Provisional application No. 61/482,654, filed on May 5, 2011.

(51) Int. Cl.
- *G06F 7/60* (2006.01)
- *G06F 17/10* (2006.01)
- *G06F 17/50* (2006.01)

(52) U.S. Cl.
CPC ........ *G06F 17/5009* (2013.01); *G06F 2217/16* (2013.01); *G06F 2217/10* (2013.01)
USPC .......................................................... 703/2

(58) Field of Classification Search
None
See application file for complete search history.

(56) References Cited

U.S. PATENT DOCUMENTS

| 2009/0083015 A1 | 3/2009 | McDaniel | |
|---|---|---|---|
| 2009/0254316 A1* | 10/2009 | Tillman et al. | 703/2 |
| 2010/0161298 A1* | 6/2010 | Kim et al. | 703/9 |

OTHER PUBLICATIONS

Horvath et al., SPH-Based Fluid Simulation for Special Effects, Mar. 2007, Dept. of Control Engr. and Information Technology Budapest University of Technology and Economics, pp. 1-6.*
Steele et al., Modeling and rendering viscous liquids, 2004, Computer Animation and Virtual Worlds, vol. 15, pp. 183-192.*
Wang et al., A Novel Centroid Particle Swarm Optimization Algorithm Based on Two Subpopulations, Applied Mechanics and Materials, vols. 29-32, pp. 929-933.*

* cited by examiner

*Primary Examiner* — Omar Fernandez Rivas
*Assistant Examiner* — Bernard E Cothran

(57) ABSTRACT

For efficient smooth particle hydrodynamics using more particle information, virtual particles are created. Each virtual particle represents an averaging of properties for the fluid particles in a cell. For density, force, or other calculations for a given fluid particle, the interaction between the particles within a cell are calculated. For calculating the influence of particles outside the cell on the particle in the cell, the virtual particles from the neighboring cells are used. The interaction with these aggregate particles reduces the number of calculations while still including the influence from particles of other cells.

18 Claims, 2 Drawing Sheets

SIMPLIFIED SMOOTHED PARTICLE HYDRODYNAMICS

RELATED APPLICATIONS

The present patent document claims the benefit of the filing date under 35 U.S.C. §119(e) of Provisional U.S. Patent Application Ser. No. 61/482,654, filed May 5, 2011, which is hereby incorporated by reference.

BACKGROUND

The present embodiments relate to particle-based fluid simulation. In smoothed particle hydrodynamics (SPH), computational fluid simulation is based on the Monte Carlo method. Internal forces are calculated between pairs of particles. For example, density is calculated as $$\rho_i^f = m^f \sum_j W(r_{ij}, h^f),$$

where i and j are neighbor particles, m is the mass, r is the radius, h is a smoothing radius limiting interaction to a range, and W is a kernel function. Pressure force is calculated as $$F_i^{pressure} = -m^f \sum_j \frac{(P_i^f + P_j^f)\nabla W(r_{ij}, h^f)}{2\rho_j^f}.$$

Viscosity force is calculated as $$F_i^{viscosity} = m^f \mu \sum_j \frac{(v_j^f - v_i^f)\nabla^2 W(r_{ij}, h^f)}{\rho_j}.$$

The forces are used to simulate advecting of the particles. Over multiple iterations, velocity is calculated as $$v_i^f\left(t + \frac{1}{2}\right) = v_i^f\left(t - \frac{1}{2}\right) + a\Delta t,$$

and position is calculated as $$L_i^f(t) = L_i^f(t-1) + v_i^f\left(t + \frac{1}{2}\right)\Delta t.$$

Since only particles within the smoothing radius, h, interact with each other, it is possible to avoid $O(n^2)$ calculations with all particles in the simulation. The need to simulate fluids at interactive speeds has further led to GPU-based implementation. By dividing the simulation space into cells, each of diminution equal to the smoothing radius, h, it is possible to iterate over all of a particle's neighbors at an order of O(mn), where m is the average number of particles per cell. If particle i is located at cell(x, y, z), i∈ cell (x, y, z) then a neighboring particle j belongs to cell(x, y, z)∪j∈ cell(x±1, y±1, z±1). Even with this efficiency, simulating at interactive speeds may be difficult. The influence of particles outside the smoothing radius is not considered.

SUMMARY

In various embodiments, systems, methods and computer readable media are provided for smooth particle hydrodynamics (SPH). For efficient SPH using more particle information, virtual particles are created. Each virtual particle represents an averaging of properties for the fluid particles in a cell. For density, force, or other calculations for a given fluid particle, the interaction between the particles within a cell are calculated. For calculating the influence of particles outside the cell on the particle in the cell, the virtual particles from the neighboring cells are used. The interaction with these aggregate particles reduces the number of calculations while still including the influence from particles of other cells.

In a first aspect, a non-transitory computer readable storage medium has stored therein data representing instructions executable by a programmed processor for smooth particle hydrodynamics. The storage medium includes instructions for defining first particles each representing one or more second particles, and simulating, for each second particle, second particle-to-second particle interaction for the second particles within a range and second particle-to-first particle interaction of each second particle within the range with first particles outside of the range.

In a second aspect, a non-transitory computer readable storage medium has stored therein data representing instructions executable by a programmed processor for smooth particle hydrodynamics. The storage medium includes instructions for dividing a simulation space into cells; assigning fluid particles to the cells; creating a centroid particle for each of the cells with at least one of the fluid particles, the centroid particle created from the fluid particles of the respective cell; determining a mass of each of the centroid particles; determining a density of each of the fluid particles as a function of centroid particles of neighboring cells and particles of cell of the fluid particle; and advecting the fluid particles as a function of the densities of the fluid particles and the densities of the centroid particles.

In a third aspect, a method is provided for smooth particle hydrodynamics. A processor divides a volume into sub-volumes. The sub-volumes are populated with fluid particles. A virtual particle represents the fluid particles for each of the sub-volumes. Force for each of the fluid particles is calculated based on the fluid particles in a same sub-volume as the fluid particle and virtual particles of adjacent sub-volumes. The calculation is not being based on individual fluid particles of the adjacent sub-volumes.

Any one or more of the aspects described above may be used alone or in combination. These and other aspects, features and advantages will become apparent from the following detailed description of preferred embodiments, which is to be read in connection with the accompanying drawings. The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the embodiments. Moreover, in the figures, like reference numerals designate corresponding parts throughout the different views.

DETAILED DESCRIPTION OF EMBODIMENTS

Particle-based fluid simulation methods, such as smoothed particle hydrodynamics (SPH), may be used to achieve interactive fluid simulation. To provide simulation while maintaining interactive speeds, virtual particles representing one or more particles of each cell are created. To be interactive, the simulation is generally updated on a per cycle basis in milliseconds. Therefore, the computation of the fluid interaction is done efficiently to maintain interactive speeds. An efficient method for SPH at interactive speed may be substituting multiple fluid particles of each cell with a larger virtual particle. The replacement virtual particle is used for calculating the contribution of particles not within a cell to interaction with a given fluid particle within the cell. SPH implementation may be faster than state of the art and suitable for interactive applications while providing a similar quality of simulation. The smoothing distance may be reduced to further increase speed, but not without reduction in the number of particles contributing force to a given fluid particle that reduces the quality of the simulation.

The enhanced SPH includes density and/or internal forces calculations. The calculations are based on representing the same fluid volume using combined particles (e.g., virtual particles) that still capture the overall fluid simulation behavior. The virtual particle is represented as a point in space with a given mass (i.e., represents the presence of mass in space) where the density for a set of particles within a grid cell is aggregated. In order to maintain the small detail features of the fluid simulation, the calculations include fluid particle-to-fluid particle interaction at the cell level. In order to include features contributed by other cells in the fluid simulation, the calculations include fluid particle-to-virtual particle interaction as well.

Figure 1:
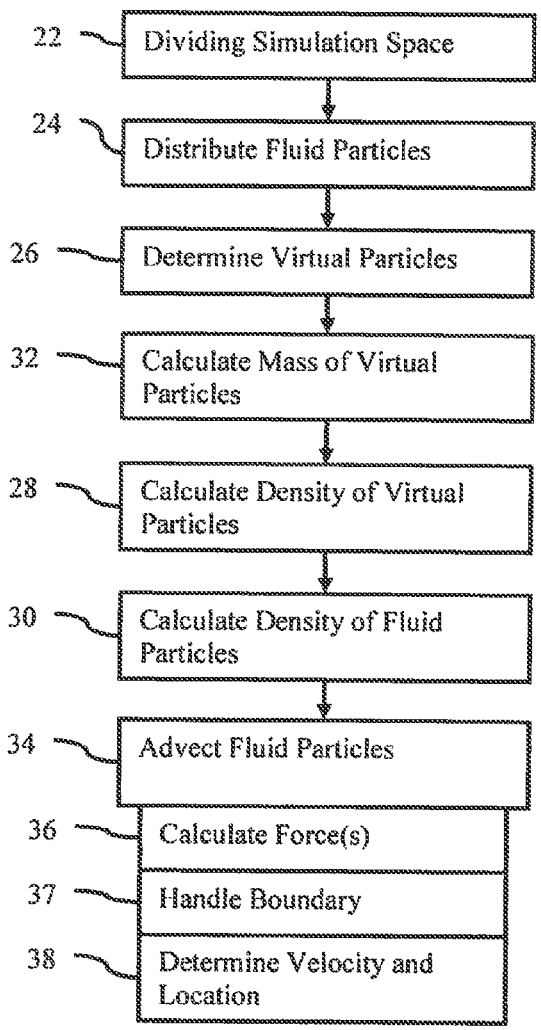
FIG. 1 is a flow chart diagram of one embodiment of a method for smooth particle hydrodynamics simulation.

FIG. 1 shows a method for smooth particle hydrodynamics in particle-based simulation. The method is implemented by the system of FIG. 5 and/or a different system. A processor performs the acts. Additional, different, or fewer acts may be provided. For example, acts 34, 36, 37, and 38 are not performed. As another example, act 37 is not performed. Acts 34-38 may be performed without acts 28, 30, and 32, at least with acts 28, 30, and 32 not using virtual particles. In yet another example, additional acts of moving a solid object and adjusting the particle motion are provided. Any further particle-based fluid simulation acts may be added.

The method is provided in the order shown. Acts 22 and 24 may be performed sequentially or in parallel with act 26. Other orders may be provided. In one embodiment, acts 22 and 24 are part of initialization performed prior to simulation. The motion of fluid particles is simulated without further performing the initialization acts. Acts 26, 28, 30, 32, and 34 are repetitively or iteratively performed as part of simulating fluid flow. In the simulation, the internal forces acting on the simulated particles and the forces between the particles and any solid objects are repetitively calculated.

In act 22, a simulation space is divided into cells. The simulation space is a volume, area, or other region. The simulation space is bounded, such as by surfaces, or is unbounded, such as representing a region of flow within a fluid.

Figure 2:
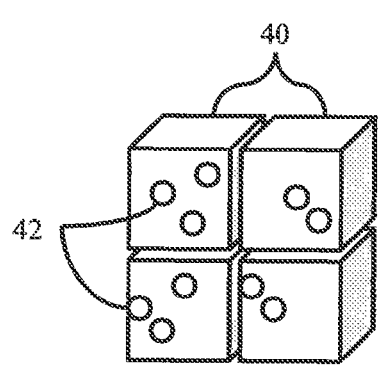
FIG. 2 is an illustration of one embodiment of dividing a particle distribution into cells.

Based on predetermined parameters and/or information input by the user, a processor divides the simulation space into the cells. Each cell is a sub-region. For example, a processor divides a volume into sub-volumes. For particle-based fluid simulation, the particles are separated into a regularly spaced grid cells. The particles are grouped into a three-dimensional distribution of cells. The simulation space is subdivided into a three-dimensional (3D) grid such that a fluid particle is located in only one cell during any simulation iteration. FIG. 2 shows four such cells 40, each including fluid particles 42. The grid cells segment particle distribution and are also used to calculate properties that contribute to the evolution of the fluid simulation.

Any number of cells may be used. The number of cells and corresponding volume of the cells may be determined based on the particle density, number of particles per cell, and/or the simulation volume of the fluid.

The cells 40 have a same size and shape, but may have different sizes and shapes. Each cell is defined as a function of a three-dimensional location of a center of the cell and a list of the simulated particles within the cell. In one embodiment, each cell is defined by a list of fluid particle objects in the cell, a length of list (a scalar value), a center of the cell (a 3-tuple), and an empty flag (a Boolean value) to distinguish cells with particles from cells without particles. In alternative embodiments, the center and/or the empty flag are not separately stored as the empty nature may be determined from the list and the center may be determined by the cell's index.

In an initial creation of the cells in act 22, a cell count is set to zero. The volume is divided into the cells, and the cell count and corresponding distribution is determined. The 3D structure of the cells is stored as a vector. The cells are stored as a one-dimensional list. The cells are accessed from the one-dimensional list as a function of an index-shift. The relation between a cell index in three-dimensional space and the cell's actual memory location is given by an index function. Given a regular distribution of cells in three dimensions, the resulting one dimensional storage vector has a regular pattern of cells representing different rows, columns, and planes. The cells of each row are sequential in the index, where each row at a given column is offset by a first index value, the number of grid elements in a column (e.g., when there are 10 columns—row 1 is 0-9, row 2 is 10-19, etc. where to find a row 2 cell adjacent to a cell in row 1 uses an offset of +10.). The repetition occurs in a similar manner for the planes using a second index value equal to the number of elements in a plane (rows×columns). Due to this regular distribution in the memory, a pattern of index shifts for acquiring all of the cells surrounding a given cell may be determined quickly. Other arrangements of the cell grid to memory may be used.

In act 24, fluid particles are assigned to the cells. The sub-volumes defined by the division of the volume are populated with fluid particles. A two or three-dimensional distribution of simulated fluid particles is defined. The fluid particles are points representing in aggregate the fluid being simulated. The fluid particles may be associated with characteristics and/or be treated as two or three-dimensional shapes. Since the fluid particles are used for simulating fluid, the fluid particles are dispersed with a regular density throughout a volume in the initial locations where fluid is to be simulated. Irregular density may be used, such as modeling the effects of temperature differences on the density of fluid.

The fluid particles may be distributed in the volume before division into sub-volumes. The creation of the cells in act 22 may result in distribution of the particles within the cells. Alternatively, the fluid particles are distributed in act 24 after creation of the cells in act 22.

The number of fluid particles per cell is the same or different for different cells. The number and arrangement of fluid particles 42 within each cell 40 may be different, such as represented in FIG. 2. In one embodiment, the number of fluid particles per cell is small, such as less than 100, 10 or other number. The division of act 22 and the distribution of act 24 provide a three-dimensional distribution of fluid particles 42 grouped into cells 40 throughout the simulation space.

The fluid particles have predetermined, calculated, user set, or assigned characteristics. The characteristics may be assigned based on the simulation to be performed. Different characteristics may be determined in the same or different ways, such as the user inputting the characteristics of position and radius. Other simulation characteristics are determined, such as a smoothing radius and volume. The input or stored information is used by the processor to determine the distribution.

The fluid particles have an assigned or fixed radius, $R^f$. All the fluid particles typically have the same radius, but different fluid particles may have different radii. As part of the distribution, the fluid particles have an assigned position, $L_i^f$. Different fluid particles are at different locations.

The smoothing radius may be assigned or constant. In one embodiment, the smoothing radius, $h^f$, is a constant calculated as $h^f = kR^f$, where $k>2$. One example value is $k=3$. The volume is another constant calculated as $$V^f = \frac{4}{3}(R^f)^3 \pi.$$

Different fluid particles have the same volume, buy may have different volumes.

The fluid particles may also be assigned a velocity. As the fluid particles move, such as moving in each iteration of the simulation, the velocity and/or location stay the same or change. For a given iteration, the velocity and location are updated as $$v_i^f\left(t - \frac{1}{2}\right) \leftarrow v_i^f\left(t + \frac{1}{2}\right) \text{ and } L_i^f(t-1) \leftarrow L_i^f(t).$$

The force is initially set to zero, $F_i \leftarrow \text{zero}$, but may be another value. The initial particle velocity may be to zero or may be set to a value to indicate an initial movement to the fluid.

Figure 3:
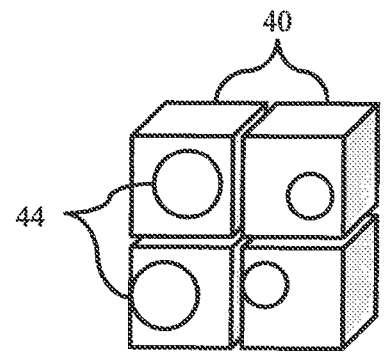
FIG. 3 is an illustration of one embodiment of creating virtual particles.

Given the distribution of fluid particles 42 in the simulation space, virtual particles are determined in act 26. While the fluid particles are virtual in the sense of representing something else (i.e., fluid), "virtual particle" is used to refer to a particle representing one or more other particles. Each virtual particle represents one or more fluid particles. For example, the fluid particles in each cell are represented by a respective virtual particle. FIG. 3 shows virtual particles 44 with one for each cell. Virtual particles 44 representing multiple cells may be used in alternative embodiments. For each non-empty cell, a virtual particle 44 is created. Each virtual particle 44 is created from the fluid particles 42 of the corresponding cell 40. The virtual particles 44 are defined to each represent one or more fluid particles 42 where each virtual particle 44 represents all of the fluid particles 42 in a given cell or other sub-volume. The number of virtual particles 44 is equal to the number of non-empty grid cells 40, but other numbers may be provided.

For each iteration of the simulation, the virtual particles are calculated. Various characteristics are calculated. For example, the position and radius of each virtual particle is determined. The position is calculated as an average position of the fluid particles in the respective cell. For example, the average position of all and only fluid particles within a cell is calculated. In one embodiment, the position, $L_g^c$, of a virtual particle is the centroid of the particles within a cell. The virtual particle may be a centroid particle. One representation of the centroid for position is $$L_g^c = \frac{1}{\text{count}(\text{cell}(g))} \sum_j L_j^f,$$

where g is a centroid particle and j is a fluid particle, cell(j)=cell(g), and count(cell(g)) is the number of fluid particles in the cell where virtual particle g is located. Other approaches to calculate a center of the centroid or position of a virtual particle may be used.

In one embodiment, the radius of the virtual particle is calculated. The radius of each of the virtual particles includes the fluid particles of the respective sub-volume. For each cell, a radius including all of the fluid particles is determined, but other criteria may be used (e.g., radius including a majority of fluid particles). To encompass all the fluid particles within a cell, the radius is set as the distance between the fluid particle furthest from the center location and the center location. The radius $R_g^c$ is variable, depending on the distribution of fluid particles, and is represented as $$r_{gj} = \|L_g^c - L_j^f\|.$$

where $$R_g^c = \max_j (r_{gj}),$$

The radius is equal to or larger than the fluid particle radius, but less than or equal to half of a maximum distance in a cell. This is represented as $R^f < R_g^c \leq \sqrt{2}h^f$ where the cell size is based on the smoothing distance for the fluid particles. The volume may be determined from the radius, such as $$V_g^c = \frac{4}{3}(R_g^c)^3 \pi.$$

The smoothing distance for the virtual particles is variable, but may be constant. In one embodiment, the virtual particle smoothing distance, $h_g^c$, is represented as $h_g^c = kR_g^c$, where $k>2$, such as $k=3$. The smoothing distance for the virtual particles is greater than or equal to the smoothing distance for the fluid particles. This is represented as $h_g^c \geq h^f$ for all g. Since a cell may include only one fluid particle, the resulting virtual particle for that cell has the location, radius, and smoothing distance of the fluid particle. Since some cells may include more than one fluid particle, the smoothing distance for these cells is greater than the smoothing distance of a single fluid particle. The position and radius are also different than any one fluid particle in the cell.

The characteristics of the virtual particles for every, most, or some of the cells are determined. In one embodiment, virtual particles are created for every cell having at least one fluid particle. For a given cell with a fluid particle, characteristics of the fluid particles within the cell and a single virtual particle are calculated.

In act 32, a mass of each of the virtual particles is determined. The mass is determined from fluid particles in the respective cell. The same fluid particles used to calculate other characteristics of the virtual particle are used to calculate the mass. The mass at the location of the virtual particle is calculated using any approach.

In act 28 and act 30, a density of each of the fluid and virtual particles is determined. The density for any given fluid particle includes two components. A first component is a contribution from other fluid particles in the same cell. A second component is a contribution from virtual particles of other cells, such as contribution from just neighboring cells. Individual fluid particles in other cells do not contribute to the density. The virtual particles representing the fluid particles are used instead. In one embodiment, virtual particle density $\rho_g^c$ is a contribution of only particles within a neighboring cell and is represented as $$\rho_g^c = m^f \sum_j W(r_{gj}, h^f).$$

Figure 4:
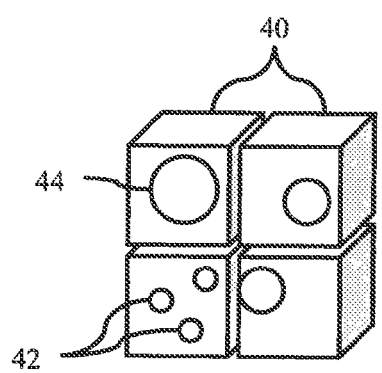
FIG. 4 is an illustration of one embodiment of using fluid particles and virtual particles in smooth particle hydrodynamics.

FIG. 4 represents calculation for fluid particles 42 in one cell with contribution from virtual particles 44 in other cells. Only four sub-volumes are shown of clarity. While FIGS. 2-4 show four sub-volumes, additional sub-volumes in the same plane and additional planes of a volume are provided The virtual particle smoothing distance and virtual particle locations may be used to determine which virtual particles contribute density for a given fluid particle. In other embodiments, neighboring is defined by the cell distribution. For cuboid cells, the virtual particles from the adjacent six (pairs along each x, y, and z dimension) or from the adjacent twenty-six (pairs along x, y, and z, plus pairs from diagonals) may be neighboring. To limit computational complexity, virtual particles from other cells (i.e., non-neighboring cells) are not used and do not contribute to the density calculation. Similarly, the virtual particle for the cell to which the given fluid particle belongs is not used since the fluid particle itself and the fluid particles of that same cell are used for individual contribution. Fluid particle density $\rho_i^f$ is calculated with a contribution of other fluid particles in same cell in addition to contribution of virtual particles in neighboring cells.

For each fluid particle, i, the density is calculated at two levels: using the contribution of particles within the same cell, and using the neighboring centroid particles in neighboring cells. This is represented as $$\rho_i^f = m^f \sum_j W(r_{ij}, h^f) + \sum_g m_g^c W(r_{ig}, h_g^c),$$

where cell(g)≠cell(i). Other functions may be used.

The density is calculated for each fluid particle of the simulation. The densities of the fluid particles are determined efficiently, even with inclusion of density contribution from neighboring cells. The contribution of other fluid particles in the same cell is similar to traditional SPH computation and of the order $O(m^2)$ where m is the average number of particles per cell. This level of complexity is minimized by only performing these operations between fluid particles within the same cell. The second phase (i.e., contribution of neighboring virtual particles) is $O(1)$ since the number of neighboring cells is constant and there is only one virtual particle per cell. The overall computation time for density is similar to SPH, $O(nm)$, but with the added influence of particles over a broader range. In practice, the number of basic operations may be smaller.

The mass of a given fluid particle is a constant, $m^f$, representing the fluid mass being simulated within the radius of the fluid particle.

The mass of each of the virtual particles is calculated as well in act 32. The mass is a function of the density for the fluid particles in the cell. Given the calculated density and the particle radius or volume, the mass of the virtual particle is calculated. The mass of a fluid particle is fixed, such as $m^f$. The mass, $m_g^c$, of the virtual particle varies with the variance in density and volume of the virtual particle. In one example, the mass is represented as $m_g^c = \rho_g^c V_g^c$, but other calculations may be used.

In act 34, the fluid particles are advected. The forces influencing each of the fluid particles is calculated in act 36, any boundary conditions are handled in act 37, and the velocity and location are calculated or updated in act 38. Additional, different, or fewer acts may be provided.

The fluid particles advect as a function of the densities of the fluid particles and the densities of the virtual particles. The densities are used for calculating the forces in act 36.

In each simulation iteration, fluid particles are advected under the effect of internal and external forces. The internal forces are calculated for all fluid particles, and collisions between fluid and any solid object are treated as external forces with respect to the fluid. Using the combination of internal and external forces, the fluid is advected.

The internal force for each fluid particle is based on the fluid particles in the same cell and virtual particles of adjacent cells. The force for the fluid particles within a given cell from adjacent cells is determined without contribution from non-adjacent cells, but any range of contribution may be used. The forces between each pair of particles within the cell are calculated during the same iteration.

To simplify calculation for fluid particles outside the cell, the force from individual fluid particles in neighboring cells is not used. Instead, the virtual force caused by the virtual particles representing the fluid particles within the adjacent cells is determined. The force at a virtual particle represents forces within a cell and is used to calculate force at fluid particles in neighboring cells. The contribution to the force applied to a given fluid particle includes a contribution from fluid particles in adjacent sub-volumes, but based on the virtual particles and corresponding virtual forces rather than individual fluid particle forces. The internal forces are calculated within a grid cell between each particle of the cell and the virtual particles of adjacent cells.

Any force may be calculated. In one embodiment, the pressure and viscosity forces are calculated. The pressure force is calculated for each of the fluid particles in the simulation space. For a given fluid particle, the pressure force is based on the densities of the other fluid particles of the cell and the densities of the virtual particles of the adjacent cells. The pressure, $P_i^f$, is represented as $P_i^f = EOS(\rho_i^f)$, where EOS is an equation of state to calculate pressure given density of the fluid particles. EOS may represent pressure for an ideal gas or the Tait equation. Other functions may be used.

The pressures $P_g^c$ for the virtual particles are calculated based on the pressure of the fluid particles within the same sub-volume and the mass of these fluid particles. The virtual pressure is calculated as $$P_g^c = m^f \sum_j \frac{P_j^f W(r_{gj}, h^f)}{\rho_j^f}$$

where the pressure for each fluid particle in the summation is $P_i^f = EOS(\rho_i^f)$.

The pressures for the virtual particles and fluid particles are used to determine the pressure force for each fluid particle. The pressure force sums pressure force from fluid particles within a cell and from virtual particles of other cells. In one embodiment, the pressure force is a function of the mass of the fluid particles, the pressures between fluid particles of a cell, the vector differential (del) of the kernel function for the cell, and the density of the fluid particles in one term and the mass of the virtual particles, the pressures between the fluid particle and the virtual particles of neighboring cells, the vector differential (del) of the kernel function for the virtual particles, and the density of the virtual particles in another term. In one embodiment, the pressure force is represented as:

$$F_i^{pressure} = -m^f \sum_j \frac{(P_i^f + P_j^f)\nabla W(r_{ij}, h^f)}{2\rho_j^f} +,$$

where i and j are fluid $$-m_g^c \sum_g \frac{(P_i^f + P_g^c)\nabla W(r_{ig}, h_g^c)}{2\rho_g^c}$$

particles, cell(j)=cell(i), g is a virtual particle, and cell(g)≠cell(i). Other pressure force functions may be used.

Another force is the viscosity force. The viscosity force is calculated for each of the fluid particles. The viscosity force is a sum of force from fluid particles within the same cell and force from virtual particles of neighboring cells. In one embodiment, the viscosity force is calculated as a function of the mass of the fluid particles, the velocity of the fluid particles and the Laplacian of the fluid particle radius over the smoothing distance, the density of the fluid particles, and the viscosity as one term and the mass of the virtual particles, the velocity of the virtual particles and Laplacian of the virtual particle radius over the virtual smoothing distance, the density of the virtual particles, and the viscosity as another term. One example representation is:

$$F_i^{viscosity} = m^f \mu \sum_j \frac{(v_j^f - v_i^f)\nabla^2 W(r_{ij}, h^f)}{\rho_j} +,$$

where i $$m_g^c \mu \sum_g \frac{(v_g^c - v_i^f)\nabla^2 W(r_{ig}, h_g^c)}{\rho_g}$$

and j are fluid particles, cell(j)=cell(i), g is a centroid particle, μ is the viscosity, and cell(g)≠cell(i). Other functions for viscosity force may be used.

The velocity of the fluid particles depends on the simulation and any previous calculated velocities (i.e., velocities determined in other iterations). For a first iteration, the velocities of the fluid particles are programmed or set by the user. The velocities for the virtual particles are a function of the velocities of the fluid particles in the respective cells. An average velocity vector may be calculated. Another example is represented as:

$$v_g^c = m^f \sum_j \frac{v_j^f \nabla W(r_{gj}, h^f)}{\rho_j^f}.$$

Other functions may be used.

Other internal forces may be used instead of or in addition to the pressure force and viscosity force. Separate pressure and viscosity forces for the virtual particles are not calculated because they are virtual and do not move. The virtual particles are created to determine a contribution from neighboring particles to any given fluid particle.

The total force may include external forces, such as associated with a boundary. The fluid particles advect as a function of any external forces. In act 37, boundary handling in the simulation is performed to determine where and to what extent external forces occur. To handle fixed obstacles in simulation space, each face of each collision surface, represented by fragments, is associated with a set of grid cells or sub-volumes that happen to be within the smoothing radius. The problem can be redefined as associating a solid fragment with a set of grid cells. The mapping finds the cells intersecting the mesh or surface representing the object, the fragment. The fragments are used to detect which fluid particles may be in collision with the object. If the center and/or any portion of the grid cell are outside the smoothing radius from the closest fragment, the cell is considered far from the fragment and ignored. During each simulation step, only fluid particles within those associated cells are tested for collision with the related face, triangle, or other fragment representing the face.

The collision of the fluid particles simulating the fluid with the boundary is detected. Where one or more fluid particles intersect or are on an interior side of the fragment as determined by collision with a fragment primitive, collisions occur. By testing for the position of fluid particles relative to the fragments, the forces acting on the particles and object due to collision may be calculated.

A fluid particle is in collision with a fragment when the fluid particle penetrates a distance, d, into the solid object from that plane. For example, $d=D-(\hat{n}.p_i)$, where D is the planar distance to the primitive's surface (smallest distance from the particle to a point on the primitive), and $\hat{n}$ is the unit surface normal. Other collision detection for the fluid particle may be used, such as determining a transition from outside to inside the fragment.

The interaction force of the collision is determined. Any force calculation may be used to represent the force from collision with a rigid or semirigid body. The force is added to the colliding fluid particle and the opposite force is added to the object. This force is an external force for the fluid particle. A fluid particle i has location $p_i$ and forces $F_i = F_i^{internal} + F_i^{external}$. The boundary force on the fluid particle is calculated as the summation of error-correction force $F_i^{error}$ and a counter force $F_i^{counter}$ as follows: $F_i^{counter} = -\hat{n} \times (\hat{n}.F_i)$ $F_i^{error} = C \times d \times \hat{n}$ where $$C = \frac{\rho_i}{\Delta t^2}$$

is a constant, proportional to particle's density $\rho_i$ and inversely proportional to the square of simulation time step $\Delta t$.

The purpose of $F_i^{counter}$ is to counter any forces exerted on particle i in a direction of normal $\hat{n}$, so $F_i^{counter}$ is weighted negatively. Normal n̂ is defined to point outward from the collision surface, $F_i^{error}$ on the other hand, is used to correct the penetration distance d that particle i has traveled inside a collision surface's surface. This may be a spring constant or other force calculation. Both $F_i^{error}$ and $F_i^{counter}$ act in the normal direction and thus this constitutes a free-slip condition. The normal for force calculation is normal to the primitive with which the fluid particle collides. Other force calculations with or without free slip or other conditions may be used.

Any other forces acting on the solid object and/or the fluid particles are calculated. The forces are applied to move the fluid particles. The vectors for the forces may be summed to determine a total force and direction, represented as: $F_i = F_i^{internal} + F_i^{external} + F_i^{counter} + F_i^{error}$. Depending on limitations on movement of the solid object, the solid object may move or not due to the application of force. When the solid object changes position, translation and rotation is applied to all the bounding volumes of the fragments.

In act 38, the velocity and location of the fluid particles is determined. The forces are applied to the fluid particles. The force contributed by the fluid particles in the same cell, the forces form the surrounding virtual particles, and the forces from any boundaries are applied to each fluid particle to determine the velocity and location of the fluid particle over a given unit of time. Since the forces are based on the density of the fluid and virtual particles, the velocity and location are a function of the densities as well as other factors.

The velocity of a given fluid particle is based on the current velocity and any change due to acceleration. The forces cause the acceleration. In one embodiment, the velocity of a fluid particle in a given iteration is represented as $$v_i^f\left(t+\frac{1}{2}\right) = v_i^f\left(t-\frac{1}{2}\right) + a\Delta t,$$

where a is the acceleration and t is time. The velocity for the initial iteration is assigned or predetermined. Different fluid particles may have different velocities and/or accelerations. The velocity may be calculated as a one, two, or three dimensional vector to account for direction.

The position of each fluid particle is based on the current position summed with an amount of displacement caused by the velocity for a given unit of time. In one embodiment, the location is represented as:

$$L_i^f(t) = L_i^f(t-1) + v_i^f\left(t+\frac{1}{2}\right)\Delta t.$$

Any other movement, deformation, or changes are applied to the simulation. The next cycle of the simulation then occurs repeating the same steps using the current configuration. In each iteration, the virtual particles are re-calculated. Different fluid particles may be within each sub-volume. The fluid particles are assigned to different sub-volumes based on location in act 24, the virtual particles are recreated in act 26, the densities of the virtual particles are calculated again in 28, the masses of the virtual particles are calculated again in act 32, and the advecting of the fluid particles is performed again in act 34. This repetition using the current velocities and locations of the fluid particles simulates fluid flow.

The simulation is performed efficiently while including information beyond the range of a single cell in an aggregate form. By including information from neighboring sub-volumes, but limited to a representative or larger particle, the efficiency of advecting or the entire simulation is much better than determining interaction between all fluid particles in the same set of cells. In one embodiment, the advecting is performed with an efficiency on an order of O(nm), where m is an average number of fluid particles per cell.

Figure 5:
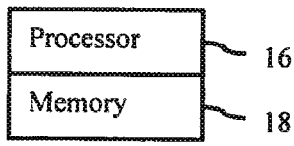
FIG. 5 is block diagram of one embodiment of a system for smooth particle hydrodynamics simulation.

FIG. 5 shows a block diagram of a system for smoothed particle hydrodynamics in fluid simulation. The system includes a processor 16 and a memory 18. Additional, different, or fewer components may be provided. For example, an input device, such as a network card, wireless transceiver, and/or user input device are provided. As another example, a display, printer, network card, wireless transceiver and/or other output device is provided.

The computer processing performed by the processor 16 may be implemented in various forms of hardware, software, firmware, special purpose processors, or a combination thereof. Some embodiments are implemented in software as a program tangibly embodied on a non-transitory program storage device. By implementing with a system or code in a memory, particle-based simulation is performed by the processor 16.

The processor 16 and/or memory 18 are part of a computer, personal computer, server, workstation, network processor, or other now known or later developed processing system. Various peripheral devices such as, for example, a display device, a disk storage device (e.g., a magnetic or optical disk storage device), a keyboard, a printing device, and a mouse, may be operatively coupled to the processor 16. A program may be uploaded to, and executed by, the processor 16. Likewise, processing strategies may include multiprocessing, multitasking, parallel processing and the like. The processor 16 is implemented on a computer platform having hardware such as one or more central processing units (CPU), graphic processing unit (GPU), a random access memory (RAM), and input/output (I/O) interface(s). The computer platform also includes an operating system and microinstruction code. The various processes and functions described herein may be either part of the microinstruction code or part of the program (or combination thereof) which is stored and executed via the operating system. Alternatively, the processor 16 is one or more processors in a network.

The instructions, user input (e.g., parameter or value assignment), rules, and/or other information are stored in a non-transitory computer readable memory, such as the memory 18. The memory 18 is an external storage device, internal storage device, RAM, ROM, and/or a local memory (e.g., solid state drive or hard drive). The same or different computer readable media may be used for the instructions and other data, such as the various parameters calculated for fluid particles and/or virtual particles. The memory 18 may be implemented using a database management system (DBMS) managed by the processor 16 and residing on a memory, such as a hard disk, RAM, or removable media. Alternatively, the memory 18 is internal to the processor 16 (e.g. cache). The memory 18 stores data used by or resulting from the particle-based fluid simulation.

The instructions for implementing the processes, methods and/or techniques discussed herein are provided on computer-readable storage media or memories, such as a cache, buffer, RAM, removable media, hard drive or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination.

In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU or system. Because some of the constituent system components and method acts depicted in the accompanying figures are preferably implemented in code, the actual connections between the system components (or the process steps) may differ depending upon the manner in which the present embodiments are programmed.

The processor 16 is configured to perform the simulation. The processor 16 receives an indication of the parameters for the simulation, such as the number, size, shape, density, and/or other characteristics of the solid objects and fluid particles. The initialization acts are performed by the processor 16 to prepare for the simulation. Alternatively, the processor 16 receives previously calculated initialization information, such as receiving an indication of storage location of particles, fragments, cells, and/or other information. The processor 16 performs the simulation, such as calculating various parameters of the fluid particles and the virtual particles and simulating fluid flow and interaction with one or more objects. The effect on the objects may also be simulated. The results of the simulation are output as images or data.

Various improvements described herein may be used together or separately. Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. In a non-transitory computer readable storage medium having stored therein data representing instructions executable by a programmed processor
for smooth particle hydrodynamics, the storage medium comprising instructions for: dividing a simulation space into cells; assigning fluid particles to the cells;
creating a virtual particle for each of the cells with at least one of the fluid particles,
the virtual particle created from the fluid particles of the respective cell; determining a mass of each of the virtual particles;
determining a surrounding density of each of the fluid particles as a function of the virtual particles of neighboring cells and particles of the cell of the fluid particle; and
advecting the fluid particles as a function of the densities of the fluid particles and the densities of the virtual particles
wherein the following calculations are provided:
(a) creating the virtual particles comprises calculating a radius of each of the virtual particles to include all the fluid particles of the respective cell;
(b) determining the mass comprises calculating the mass of each of the virtual particles as a function of a densiW of the respective virtual particle;
(c) determining the surrounding density of each of the fluid particles comprises calculating a contribution from the fluid particles in a same cell and not individual ones of the fluid particles of other cells, and calculating a contribution from the virtual particles of the neighboring cells and not of the cell of the fluid particle;
(d) advecting comprises calculating a pressure force for each of the fluid particles, the pressure force being based on the densities of the fluid particles of the cell and the densities of the virtual particles of the neighboring cells;
(e) advecting comprises calculating a viscosity force for each of the fluid particles, the viscosity force being based on the densities of the fluid particles of the cell and the densities of virtual particles of the neighboring cells; and
(f) advecting comprises determining velocity and position of the fluid particles as a function of forces, the forces being a function of the densities of the fluid particles and the densities of the virtual particles.

2. The non-transitory computer readable storage medium of claim 1 wherein dividing and assigning comprises defining a three-dimensional distribution of the fluid particles grouped into the cells.

3. The non-transitory computer readable storage medium of claim 1 wherein creating the virtual particles comprises calculating a position of the virtual particles as an average of positions of the fluid particles in the respective cell.

4. The non-transitory computer readable storage medium of claim 1, comprising calculation (a).

5. The non-transitory computer readable storage medium of claim 1, comprising calculation (b).

6. The non-transitory computer readable storage medium of claim 1 wherein determining the mass of each of the virtual particles comprises determining a density and volume only from fluid particles in the respective cell.

7. The non-transitory computer readable storage medium of claim 1, comprising calculation (c).

8. The non-transitory computer readable storage medium of claim 1, comprising calculation (d).

9. The non-transitory computer readable storage medium of claim 1, comprising calculation (e).

10. The non-transitory computer readable storage medium of claim 1, comprising calculation (f).

11. The non-transitory computer readable storage medium of claim 1 wherein assigning, creating, determining the mass, determining the densities of the fluid particles, and advecting are repeated to simulate fluid flow.

12. The non-transitory computer readable storage medium of claim 1 wherein advecting comprises advecting as a function of an external force associated with a boundary.

13. A method for smooth particle hydrodynamics, the method comprising:
dividing, with a processor, a volume into sub-volumes;
populating the sub-volumes with fluid particles;
determining a virtual particle to represent the fluid particles for each of the sub-volumes;
calculating a radius of each of the virtual particles to include all the fluid particles of the respective sub-volume;
calculating a mass of each of the virtual particles as a function of the density of the virtual particle;
calculating a contribution from the fluid particles in a same cell and not individual ones of the fluid particles of other cells, and calculating a contribution from the virtual particles of the neighboring cells and not of the cell of the fluid particle;
calculating a pressure force for each of the fluid particles, the pressure force being based on densities of the fluid particles of the sub-volume and the densities of the virtual particles of the adjacent sub-volumes;

calculating a viscosity force for each of the fluid particles, the viscosity force being based on the densities of the fluid particles of the sub-volume and the densities of the virtual particles of the adjacent sub-volumes, the calculating not being based on individual fluid particles of the adjacent sub-volumes; and determining velocity and position of the fluid particles as a function of forces, the forces being a function of the densities of the fluid particles and the densities of the virtual particles.

14. The method of claim 13 wherein calculating comprises calculating the force for the fluid particles without contribution from non-adjacent sub-volumes.

15. The method of claim 13 wherein calculating comprises calculating a virtual force of the virtual particles as representing the forces within the respective cells and calculating the force for each of the fluid particles with contribution from the fluid particles in adjacent sub-volumes being the corresponding virtual forces.

16. The method of claim 13 wherein determining comprises:
calculating a position of each of the virtual particles as an average of positions of only the fluid particles in the respective sub-volume; and
calculating a density of each of the virtual particles only from fluid particles in the respective sub-volume.

17. In a non-transitory computer readable storage medium having stored therein data representing instructions executable by a programmed processor for smooth particle hydrodynamics, the storage medium comprising instructions for:
defining first particles each representing second particles within a range;
simulating, for each second particle, second particle-to-second particle interaction for the second particles within the range and second particle-to-first particle interaction of each second particle within the range with first particles outside of the range;
the following instructions include:
(a) calculating a radius of each of the first particles to include all the second particles within the range;
(b) determining a mass of each of the first particles as a function of a density of the respective first particles;
(c) determining a density of each of the second particles as a function of (1) the first particles outside of the range, and not of the second particles outside the range, and (2) the second particles within the range, and not of the first particle inside the range;
(d) calculating a pressure force for each of the first particles, the pressure force being based on the densities of the first particles of the cell and the densities of the second particles of the neighboring cells;
(e) calculating a viscosity force for each of the first particles, the viscosity force being based on the densities of the first particles of the cell and the densities of second particles of the neighboring cells; and
(f) determining velocity and position of the first particles as a function of forces, the forces being a function of the densities of the first particles and the densities of the second particles.

18. The non-transitory computer readable storage medium of claim 17 further comprising dividing a simulation space into cells, the second particles distributed within the cells throughout the simulation space, wherein the first particles represent all of the second particles in respective cells, wherein simulating the second particle-to-second particle interaction comprises interaction within one of the cells, and wherein simulating second-particle-to-first particle interaction comprises interaction with neighboring cells, the range defining the neighboring cells.

* * * * *